May 13, 1924.

M. E. CHANDLER

SHOCK ABSORBER

Filed Jan. 10, 1921

1,493,734

Inventor
Milton E. Chandler
By Brown Boettcher Dinner
Attorneys

Patented May 13, 1924.

1,493,734

UNITED STATES PATENT OFFICE.

MILTON E. CHANDLER, OF CHICAGO, ILLINOIS, ASSIGNOR TO STROMBERG RESEARCH CORPORATION, OF CHICAGO, ILLINOIS, A CORPORATION OF ILLINOIS.

SHOCK ABSORBER.

Application filed January 10, 1921. Serial No. 436,126.

*To all whom it may concern:*

Be it known that I, MILTON E. CHANDLER, a citizen of the United States, residing at Chicago, in the county of Cook and State of Illinois, have invented a certain new and useful Improvement in Shock Absorbers, of which the following is a full, clear, concise, and exact description, reference being had to the accompanying drawings, forming a part of this specification.

This invention relates to shock absorbing devices for use in connection with vehicles.

The invention has its particular utility incidental to a vehicle in which the running gear and frame are connected by springs for absorbing ordinary shocks incident to travel over rough places in a roadway, but, of course, is not limited in its application to such a mechanical organization.

The primary aim of this invention is to provide a shock absorbing device for overcoming the reaction of springs when subjected to relatively great shocks, and to absorb such shocks both upon encountering the rough spots in the roadway and upon recoil or reaction of the springs or other instrumentalities forming the connection.

Another object of the invention is to obtain the desired result through inserting between the running gear and body of a vehicle a yieldable and progressively increasing resistance to shock or sudden motion; which will, through a limited degree of motion, be inactive, but which, upon tendency to create motion beyond the prescribed limits, in either direction, will check such movement and relieve undue vibrations, making more smooth and comfortable the riding qualities of the vehicle.

A further object of the invention is to construct a device of the class referred to, which may be quickly and easily installed in operative position on the conventional form of automobile running gear, without material alteration of the vehicle structure, and which is simple in construction, easy to manufacture, and strong and durable.

Briefly stated, the invention comprises two relatively movable members, one of which is provided with one or more friction shoes, and the other with a surface to be engaged by said shoes. The member having the said surface is provided with means for bringing the shoes into engagement with the surface when relative rotative movement of the members occurs in either direction beyond certain prescribed limits, thereby setting up a resistance to such movement and progressively increasing said resistance to a maximum degree, at the same time always permitting relative movement of the members so that no fracture of the parts is possible. A particular construction which I prefer to use will be described and shown, but I reserve the right to alter the details thereof in so far as the claims permit.

As distinguished from the prior art my invention operates whereby the arresting or checking means is actuated to bring not only greater pressure between the relatively movable members, but to increase the area of contact.

A more concrete understanding of my invention may be obtained from the following detailed description, taken in connection with the accompanying drawings, in which.

Figure 1:
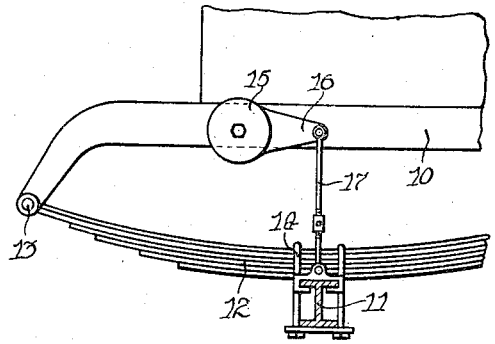
Figure 1 is a fragmentary side elevation of a vehicle showing one application of the device of my invention thereto.

Referring more particularly to the drawing, 10 designates the frame or chassis, 11 one of the axles of the vehicle, front or rear, as the case may be. In the present instance, the chassis is mounted on the axle through the medium of an ordinary leaf spring 12 pivotally connected at 13 to the free end of the chassis and secured to the axle by means of U-bolts 14. The invention is shown applied between the chassis and axle, and as having a certain relation thereto, which will be described in detail later. The shock absorber of my invention is shown at 15 and is mounted on the frame 10, the shock absorber having an arm 16, which is connected by an adjustable link 17, with the axle 11.

Figure 2:
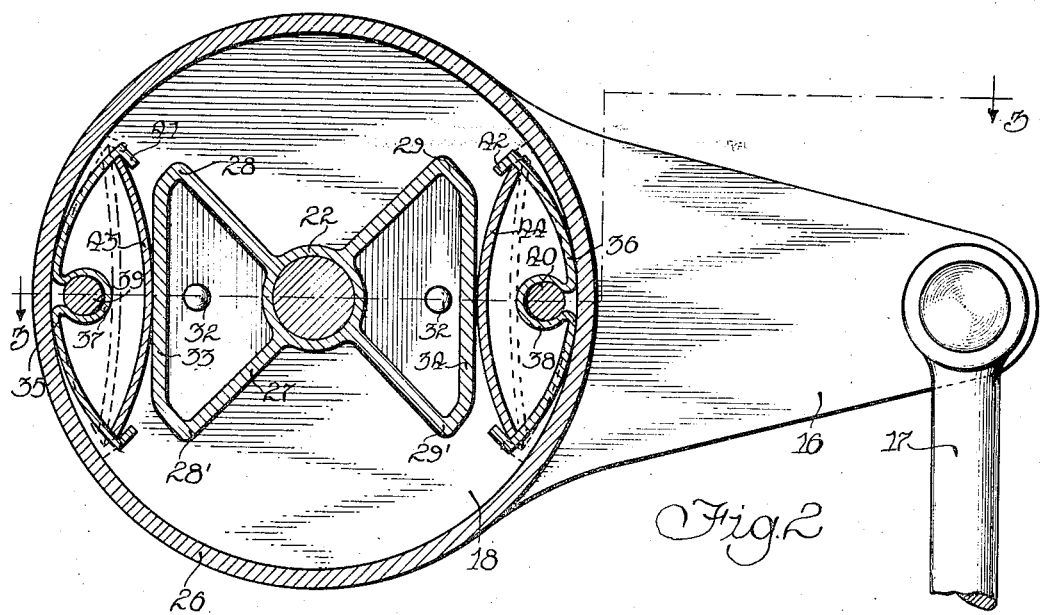
Figure 2 is a vertical section taken on the line 2—2 of Figure 3.
Figure 3:
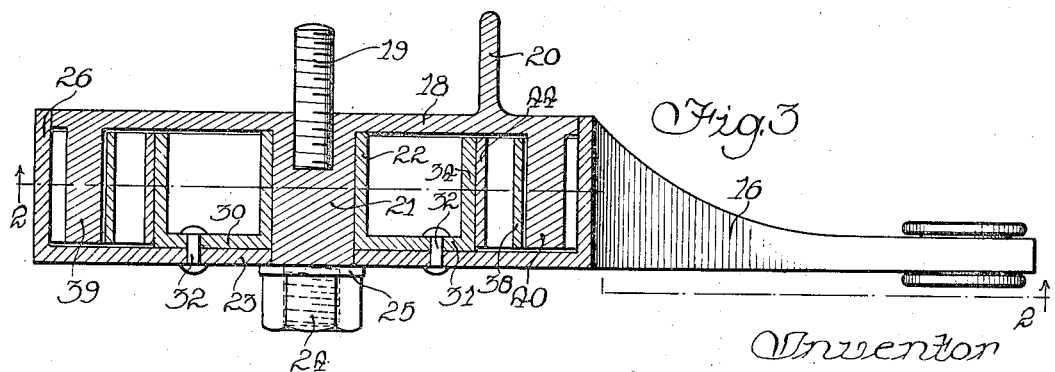
Figure 3 is a horizontal section taken on the line 3—3 of Figure 2.

Referring now particularly to the preferred embodiment of the invention, as disclosed in Figures 2 and 3, I provide a base plate 18. The plate 18 is circular in form and is secured to the chassis or frame 10 by means of a bolt 19, which is adapted to pass through a suitable opening (not shown) provided in the chassis, the bolt receiving a suitable nut or the like for retaining the plate in position. A lug 20 engages in another opening (not shown) formed in the chassis, or beneath one edge of the chassis to prevent rotation of the plate.

A stud 21 extends from the center of the plate and is adapted to receive the hub portion 22 of the drum 23. The free end of the stud 21 is reduced and threaded to receive a nut 24 having a washer 25 therebeneath for retaining the drum against displacement. The drum 23 is provided with a peripheral wall 26 and carries a cam 27 having, in the present instance, four high points 28, 28' and 29 and 29'. As shown, the cam is a single casting with the hub 22 and provided with side portions, 30 and 31, which are riveted as at 32—32 to the drum 23, but, of course this structure may be varied, if desired, it being possible to cast the cam integrally with the drum. The cam portions are hollow in order to lighten the construction and reduce cost of manufacture. The cam is provided with the flat surfaces 33 and 34, and is adapted to assume normally a position shown in Figure 2.

As set forth briefly hereinbefore, the object is to set up a progressively increasing resistance to movement between the elements 18 and 23 and I accomplish this by means of the spring shoes 35 and 36, said shoes consisting of spring strips normally of less radius than the radius of the wall 26, the intermediate portions of the shoes or strips 35 and 36 being looped as at 37 and 38, respectively, about pins 39 and 40, respectively, cast with or otherwise carried by the plate 18. The free ends of the shoes 35 and 36 are bent inwardly as at 41 and 42, respectively, to embrace the free ends of spring strips 43 and 44, respectively. The spring strips 43 and 44 expand inwardly toward the stud 21, and contact lightly with the flat surfaces 33 and 34 of the cam 27. It will be seen that the shoe 35 and 36 and strips 43 and 44 complete a toggle construction.

In operation, the device is mounted as shown in Figure 1. It will be evident that when ordinary unevenness is encountered in a roadway, the slight vibration of the axle relative the frame of the vehicle will be unrestricted, as the flat surfaces 33 and 34 will have a relatively negligible effect upon the friction shoes 35 and 36. However, when a severe shock is imparted to the axle, the arm 16 will be raised, rotating the drum 23 and circular wall 26 relative the plate 18. This rotation carries the cam to a point where the high points thereof above and below the center and diagonally opposite each other engage the strips 43 and 44. Upon upward movement of the arm 16, the high points 28 and 29' will be brought into engagement with the strips 43 and 44. Such movement compresses the strips and expands the shoes 35—36, progressively bringing the outer surfaces of said shoes to a greater extent into contact with the inner surface of the wall 26, and setting up a resistance to rotation of said wall relative the base-plate 18. The dotted line positions shown in Figure 2 indicate the general conformity of the shoes when so distorted from normal position. It will be seen, however, that while a progressive resistance is set up tending to prevent relative rotation of the moving parts of the device, hence the axle, there is no positive stop which might tend to cause fracture of the parts. Upon the reaction or recoil of the vehicle body, owing to the normal functioning of the supporting spring 12, the opposite high points of the cam, namely 28' and 29, engage the shoes 35 and 36, and reduce the degree of motion in the opposite direction; thus the movement of the body of the vehicle relative the ground or roadway, is materially reduced, so that while the axle may follow with precision all of the severe uneven places in a roadway, the body of the vehicle will be caused to travel in a substantially even horizontal plane at all times.

While the plate 18 is shown and described as connected rigidly to the chassis of the vehicle, it will be obvious that if desired an arm may be provided on the plate similar to the arm 16, and pivotally connected to the frame, if desired. The frame or chassis acts as such an arm in the present mounting of the device. Furthermore, by changing the high points of the cam different degrees of pressure and resultant friction may be had in different directions. Such a modification is readily within the scope of the present invention, and has therefore not been shown. In view of the possibility of such modifications when placing the device on the market, I reserve the right to make such changes as do not depart from the spirit and scope of the claims.

I claim:

1. In combination, two relatively rotatable elements, one of which has a circular wall, spring means on the other element for surface engagement with said wall, and means carried by the element having the circular wall and rotatable therewith for moving said spring means into engagement with said wall upon relative rotation of the elements.

2. In a shock absorber of the class described, two relatively rotatable elements adapted to assume normal relative positions, one of said elements having a circular wall, means on the other element for surface engagement with said wall, and means carried by the element having the circular wall and rotatable therewith for moving said first means progressively into yielding engagement with the wall upon relative movement of the elements in either direction from normal position.

3. In a shock absorber of the class described, two relatively rotatable elements adapted for connection between the frame and axle of a vehicle, means carried by one of said elements and engageable with the other of said elements for establishing yieldable resistance to their relative movement and means on the element with which said yieldable resistance establishing means is engageable and rotatable therewith for moving said yieldable resistance establishing means into operative engagement with said element when the elements are relatively moved in either direction.

4. In a shock absorber of the class described, two relatively rotatable elements adapted for connection between the frame and axle of a vehicle and adapted to assume normal positions, one of said elements having a circular wall, yieldable means on the other element normally out of engagement with said wall and means carried by the circular wall element and rotatable therewith for moving said yieldable means with progressively increasing force into engagement with the wall when said elements are relatively moved out of normal position in either direction.

5. In a shock absorber of the class described, two relatively rotatable elements, one of said elements having a circular wall, resilient friction means on the other element for surface engagement with said wall, and cam means carried by the element having the circular wall and rotatable therewith for moving said resilient means into engagement with said wall upon relative rotation of the elements, said resilient means being arranged between the wall and said cam means.

6. In a shock absorber of the class described, two relatively rotatable elements adapted for connection between the frame and axle of a vehicle, one of said elements having a circular wall, yieldable spring shoes on the other element normally out of engagement with said wall, and a cam carried by and rotatable with the element having the circular wall for moving said shoes with progressively increasing force into engagement with the wall when said elements are relatively rotated out of normal position in either direction.

7. In a shock absorber of the class described, two relatively rotatable elements adapted for connection between the frame and axle of a vehicle and adapted to assume a normal position, flexible shoes carried by one of said elements and arranged adjacent the other element and cam means carried by and rotatable with said other element for moving said shoes progressively into yielding engagement with the element carrying said cam means, said cam means permitting limited relative movement of the elements without actuation of the shoes.

8. In a shock absorber of the class described, two relatively rotatable elements adapted for connection between the frame and axle of a vehicle, one of said elements having a circular wall and carrying a cam, said elements adapted to assume a normal position, elastic friction means on the other element adapted to be moved into engagement with said wall by said cam when the elements are relatively moved in either direction, said elastic friction means and cam being so arranged as to permit of limited free relative movement of the elements within prescribed limits, movement of the elements beyond said limits being progressively and yieldably resisted by engagement of said shoes between the cam and the circular wall carried by the first of said elements.

9. In a shock absorber of the class described, two relatively rotatable elements adapted for connection between the frame and axle of a vehicle, one of said elements having a circular wall and carrying a cam rotatable with said wall and the other having a plurality of flexible friction shoes thereon, said shoes having engaging surfaces normally of less radii than the radius of the wall, limited movement of the elements within prescribed limits being possible, but movement beyond such limits causing said cam to flex said shoes with increasing force into conformity and engagement with said wall to check relative movement of the elements in either direction.

10. In a shock absorber of the class described, two relatively rotatable parts, one part comprising a cam and an enclosing casing and the other part comprising a spring shoe, said cam moving said shoe into engagement with said casing upon relative rotation between the parts.

11. In a device of the class described, a pair of members adapted for connection with parts subject to relative movement, a yieldable shoe including a pair of oppositely curved yieldable portions, one adapted to be spread into engagement with one of said members and cam means, co-operable with the other of said shoe portions for effecting the spreading of said first portion upon relative movement between the parts.

12. In combination with parts subject to relative movement, of a base member adapted for connection with one of said parts, said base member having a projecting stud, a second member rotatively mounted upon said projecting stud and adapted for connection with the other of said parts, a yieldable shoe attached to the base member, said shoe including a yieldable curved portion adapted for engagement with said second member and an oppositely curved portion and means engageable with said oppositely curved portion for effecting engagement of said first curved portion with said second member upon relative movement between the parts.

In witness whereof, I hereunto subscribe my name this 28th day of December, 1920.

MILTON E. CHANDLER.